United States Patent
Mahna et al.

(10) Patent No.: US 12,444,002 B2
(45) Date of Patent: Oct. 14, 2025

(54) MULTISIDED AGNOSTIC INTEGRATION SYSTEM

(71) Applicant: ADP, Inc., Roseland, NJ (US)

(72) Inventors: Abhishek Mahna, Pasadena, CA (US); Jeffrey M. Ku, Altadena, CA (US); Manish Bhatnagar, Irvine, CA (US); Naveen Kumar Chappa, Arcadia, CA (US); Robert Seres, Valencia, CA (US); Leonard D. Kim, South Pasadena, CA (US)

(73) Assignee: ADP, Inc., Roseland, NJ (US)

( * ) Notice: Subject to any disclaimer, the term of this patent is extended or adjusted under 35 U.S.C. 154(b) by 461 days.

(21) Appl. No.: 17/830,524

(22) Filed: Jun. 2, 2022

(65) Prior Publication Data

US 2023/0394593 A1 Dec. 7, 2023

(51) Int. Cl.
*G06F 9/54* (2006.01)
*G06Q 30/04* (2012.01)
*G06Q 40/12* (2023.01)

(52) U.S. Cl.
CPC ........ *G06Q 40/125* (2013.12); *G06F 9/547* (2013.01); *G06Q 30/04* (2013.01)

(58) Field of Classification Search
CPC ....... G06F 9/547; G06Q 40/125; G06Q 30/04
See application file for complete search history.

(56) References Cited

U.S. PATENT DOCUMENTS

| 10,326,670 | B2 * | 6/2019 | Sharma | G06F 16/285 |
|---|---|---|---|---|
| 10,616,352 | B2 * | 4/2020 | Elangovan | H04L 67/568 |
| 11,080,105 | B1 * | 8/2021 | Birkett | G06F 9/541 |
| 2003/0105887 | A1 * | 6/2003 | Cox | G06F 9/541 |
| | | | | 719/328 |
| 2006/0195477 | A1 * | 8/2006 | Deem | G06F 16/252 |
| 2011/0093535 | A1 * | 4/2011 | Takakura | G06Q 10/06 |
| | | | | 709/203 |
| 2016/0140520 | A1 * | 5/2016 | Antoo | G06Q 20/10 |
| | | | | 705/44 |
| 2016/0227045 | A1 * | 8/2016 | Hunt | H04M 15/765 |
| 2017/0052780 | A1 * | 2/2017 | Clevenger | G06F 8/36 |
| 2018/0276053 | A1 * | 9/2018 | Kesavan | G06F 9/541 |
| 2019/0056979 | A1 * | 2/2019 | Bryan | G06F 9/542 |
| 2020/0074565 | A1 * | 3/2020 | Dotter | G06F 16/907 |
| 2021/0304143 | A1 * | 9/2021 | Lucas | G06F 21/6245 |
| 2023/0018043 | A1 * | 1/2023 | Kwon | H04L 67/06 |

(Continued)

FOREIGN PATENT DOCUMENTS

WO WO-2022126266 A1 * 6/2022

*Primary Examiner* — Kevin L Young
*Assistant Examiner* — Jennifer Marie Gutman
(74) *Attorney, Agent, or Firm* — Foley & Lardner LLP (57) ABSTRACT

The present disclosure relates generally to an integration system and, more particularly, to a multisided agnostic integration system and method of use. The method includes: receiving, by a computer system, data from a system as defined by a single set of product agnostic application programming interfaces (APIs); receiving, by the computer system, a request to execute at least one product offered by a third party provider; parsing, by the computer system, the received data defined by the single set of product agnostic APIs which are needed to execute the at least one product; executing the at least one product using the parsed data; and providing notification to a client that the product has been executed.

21 Claims, 6 Drawing Sheets

(56) References Cited

U.S. PATENT DOCUMENTS

2023/0063160 A1\* 3/2023 Spector .................. G06F 9/543
2023/0281648 A1\* 9/2023 Connolly ........... G06Q 30/0202
                                                          705/7.31

\* cited by examiner

MULTISIDED AGNOSTIC INTEGRATION SYSTEM

TECHNICAL FIELD

The present disclosure relates generally to an integration system and, more particularly, to a multisided agnostic integration system and method of use.

BACKGROUND

Compliance solution (CoSo) products may be a framework of systems used to establish controls and which are integrated into business processes. Collectively, these controls provide assurance that the organization is operating ethically, transparently and in accordance with established industry standards. In a particular application, compliance solution products may be used with human resource applications including payroll processes.

Many companies use enterprise resource planning (ERP) for payroll processes. These ERP may need to integrate with Compliance solution systems in order to provide post payroll processes. These ERP providers (also referred to as partners), though, may use different systems, file formats, coding, etc., internally, which need to interface with the Compliance Solution systems to provide such post payroll processing. These post payroll processes or products may include, for example, wage garnishment, worker payroll taxes, employment verification, etc.

To access the different post payroll products, product specific interfaces are used to access the human resource systems and provide the instructions as what data is needed for the specific product. In this way, an interface needs to be built for each and every product. Also, clients (e.g., consumers of the services of the ERP provider and and/or Compliance solution systems) need to send data for each post payroll process or product separately in the form of files. For employment tax, specifically, clients need to send the same data every payroll run, every month or every quarter. If a client has subscribed to more than one post payroll process or product, e.g., tax, wage payments, wage garnishments, employment verification, etc., they need to send the same data for each product separately (even when majority of the data is similar or can be leveraged by other products). Also, the client needs to input the same profile data which has already been entered on the ERP database, to onboard, thus increasing onboarding time. These processes are time consuming and expensive.

Also, the client or ERP provider needs to build client specific integration applications for each product and each user. This process may take months, which makes it difficult to manage and also increases the cost of implementation and maintenance. And usually the client hires a system integrator to build the different integration applications, which is expensive and time consuming. Moreover, due to the extensive time needed to build these specific integration applications, it is not possible to provide real-time processing when a client subscribes to a new product.

SUMMARY

In a first aspect of the present disclosure, a method includes: receiving, by a computer system, data from a system as defined by a single set of product agnostic application programming interfaces (APIs); receiving, by the computer system, a request to execute at least one product offered by a third party provider; parsing, by the computer system, the received data defined by the single set of product agnostic APIs which are needed to execute at least one product; executing at least one product using the parsed data; and providing notification to a client that the product has been executed.

In another aspect of the present disclosure, there is a computer program product that includes one or more computer readable storage media having program instructions collectively stored on the one or more computer readable storage media. The program instructions are executable to: receive, by a computer system, data from a system as defined to be sent by a single set of product agnostic application programming interfaces (APIs); aggregate, by the computer system, the data received from the system; receive, by the computer system, a triggering event to execute at least one product offered by a third party provider; select, by the computer system, data from the aggregated data needed to implement the at least one product; execute the at least one product; and providing results of the execution of the product to a client.

In a further aspect of the present disclosure, there is a computer system that includes a processor, a computer readable memory, one or more computer readable storage media, and program instructions collectively stored on the one or more computer readable storage media. The program instructions are executable to: receive technical requirements for building a single set of product agnostic APIs; build an application which uses a single set of product agnostic APIs based on the technical requirements, the single set of product agnostic APIs categorizing data to be sent based on categories that can be used over multiple products; and use the single set of product agnostic APIs to send data to a third party system for execution of a product that requires data that is defined across multiple product agnostic API of the single set of product agnostic APIs; and receive a result of the execution of the product.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION OF ASPECTS OF THE INVENTION

The present disclosure relates generally to an integration system and, more particularly, to a multisided agnostic integration system and method of use. In more specific embodiments, the multisided agnostic integration system includes an automated iPaaS (integration Platform as a Service) platform that allows an external client or internal client (e.g., a consumer of the product) to integrate with certain products through a single set of product agnostic APIs. The product agnostic APIs can define or categorize groupings of data which can be leveraged across various products in an event based fashion. Advantageously, the multisided agnostic integration system allows clients to avoid sending the same data to a provider for different offered products with multiple APIs. The solution also improves client experience and reduces overall client costs.

In embodiments, the products may be compliance solution (CoSo) products. For example, the compliance solution products may include, amongst other products, payroll/ employer tax calculations and filings, wage garnishments and funds disbursement, tax credit opportunities, affordable health care compliance and employment and/or unemployment verification. Other types of products or offerings are also contemplated herein. The client may be utilizing an enterprise resource planner (ERP) offered by ERP providers (software partners), which may utilize software products that manage human resource activities and which require access to the products (which reside on another computing system) to complete their offerings/solutions.

In implementation, the integration platform connects the clients' ERP to a Compliance Solution system, e.g., such as ADP Smart Compliance Solutions, comprising an integrated suite of technologies (e.g., compliance products) that help businesses manage employees through a seamless reliable interface ecosystem. The seamless interface ecosystem may use intelligent APIs that understand the data needs across multiple products, e.g., post-payroll outsourcing services (or other services), and which are capable of providing a full suite of services across various industry standard products. Accordingly, by implementing the aspects disclosed herein, the client will be able to obtain timely and accurate fulfillment of their compliance obligations using a single set of product agnostic APIs, which leverage data across multiple products and which provides a simplified and efficient data exchange between various products and the client.

Accordingly, aspects of the present disclosure provide a system, a method, and/or a computer program product configured to provide a technical solution to a technical problem. For example, the multisided agnostic integration system provides an external or internal a consumer (e.g., ERP partner) the ability to integrate with compliance solution products such as tax, garnishments, wage payments employment verification, etc., using product agnostic APIs. The clients (e.g., end consumer of the product) can access the compliance solutions through an online portal that provides access to the compliance solutions, reports, etc., without the need to create separate interfaces or build unique integrations for each product. This may be accomplished using a set of product agnostic APIs that allow the client to send and leverage the required data to a service provider, e.g., ADP Inc., without concern for each product offering and which can be leveraged by multiple products based on client subscriptions.

Many advantages may accrue by implementing the system, method and computer program product as described herein. For example, amongst other advantages:
 (i) an API based interface allows clients (or ERP providers) to push payroll information from the client to a service provider such as ADP Inc. using a single event-based data stream interface;
 (ii) different compliance solution products can leverage the same data pushed once, which reduces the redundant data flow and data inconsistencies across products, drastically reducing the error rates;
 (ii) any consumer/ERP Partner can use the same set of APIs to push data in a similar fashion regardless of internal systems, format of data, file type, coding, etc., thereby reducing the maintenance cost required to support each client specific integration. This will also allow the service provider (e.g., ADP Inc.) to enter mid to small size market segments; and
 (iv) a consumer/ERP Partner may respond electronically and immediately to all the product specific requirements in a timely fashion, thereby reducing delays in processing.

Implementations of the present disclosure may be a system, a method, and/or a computer program product. The computer program product may include a computer readable storage medium (or media) having computer readable program instructions thereon for causing a processor to carry out aspects of the present disclosure.

Figure 1:
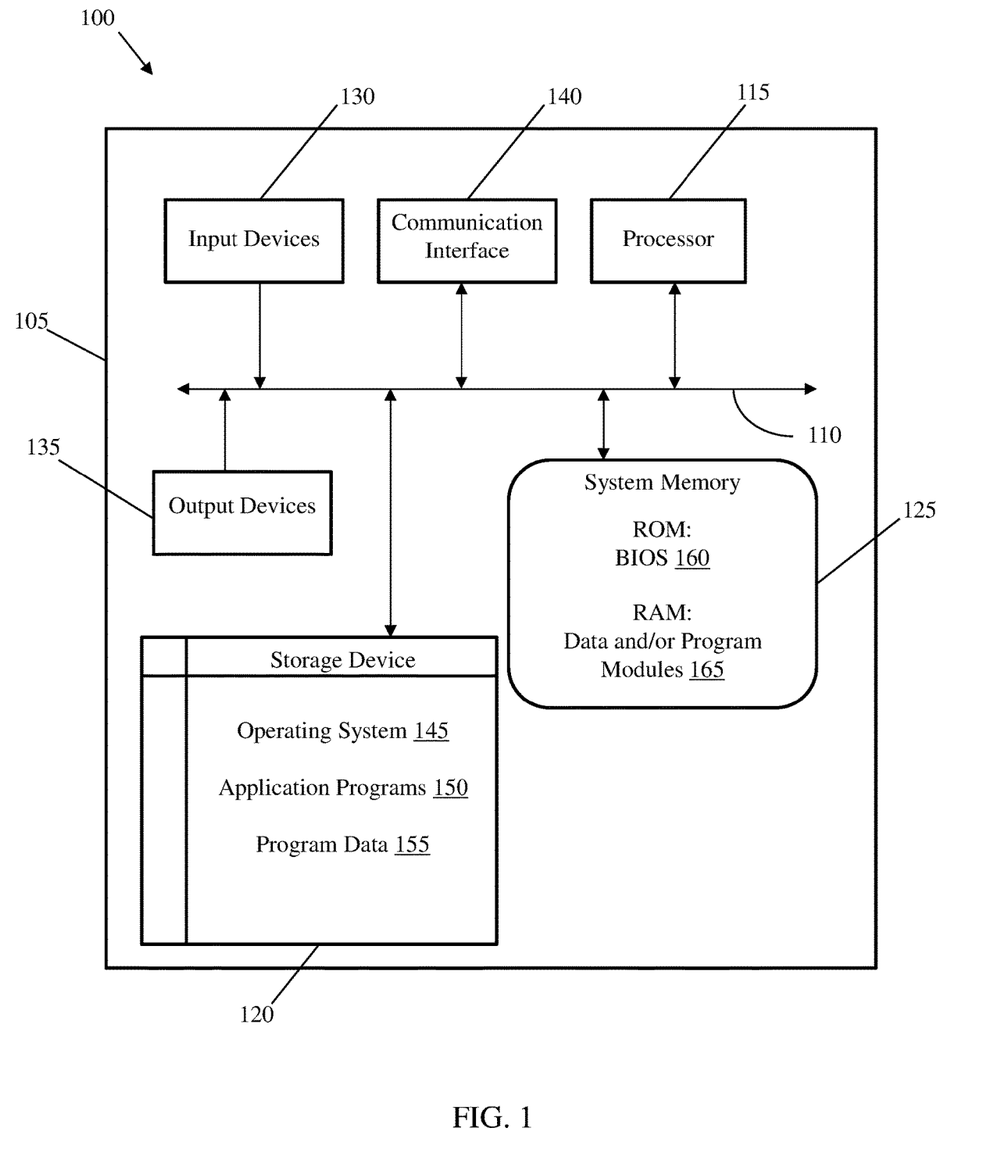
FIG. 1 is an illustrative architecture of a computing system implemented in embodiments of the present disclosure.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
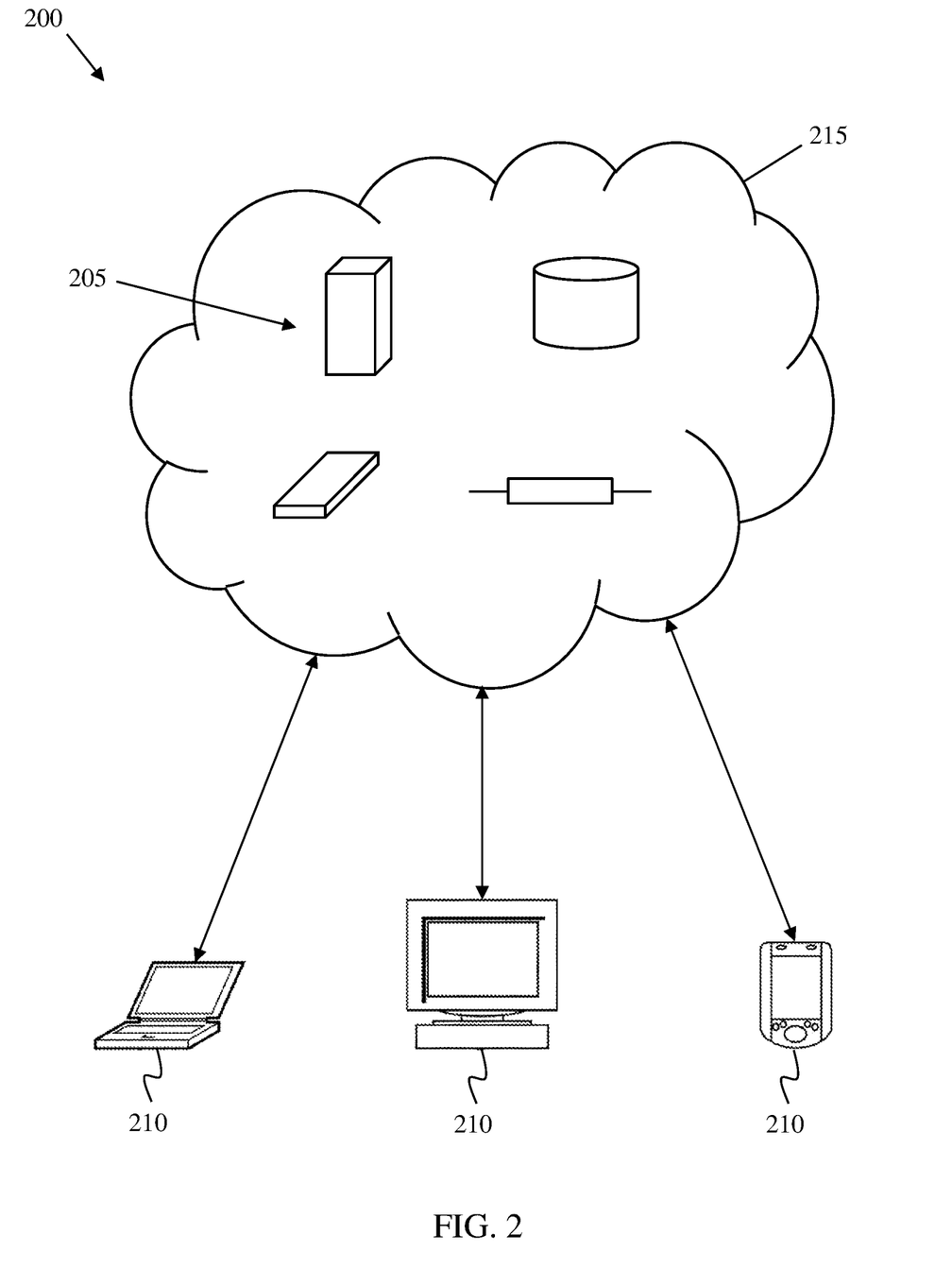
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions.

For example, processor 115 enables the computing device 105 to leverage a single set of product agnostic APIs to integrate and leverage data with any combination of compliance solution products such as tax, garnishments, wage payments, employment verification, etc. For example, in embodiments, the single set of product agnostic APIs categorizes the data in a such a way that all of the sent data defined in the product agnostic APIs can be leveraged across multiple offered products, independent of client subscription or specific product usage. This allows each product to leverage their own specific data requirements without the need to send the same data multiple times for different product as is currently the process when using product specific APIs. That is, the use of the single set of product agnostic APIs allows data required for various products to be sent only a single time, but yet still provides the necessary data to be leveraged by any of the various products. This is due to the fact that the single set of product agnostic APIs is not product specific, but categorizes the data into groups or categories capable of being parsed (selected) to leverage across various products. Also, in embodiments, the single set of product agnostic APIs may be executed by a client (e.g., external or internal client) or ERP provider based on the occurrence of certain events (e.g., payroll, worker profile update, worker tax adjustments, lien history etc.), as described in more detail herein.

Accordingly, by implementing the single set of product agnostic APIs, external or internal partners such as ERP providers can integrate with the platform of the service provider (e.g., ADP Inc.) in a seamless flow without providing redundant data for each different product. And instead of running a separate integration and transmitting required data separately to a service provider for each product, the single set of product agnostic APIs allows the partner (e.g., ERP provider) to send specific event-based data to the service provider (e.g., ADP Inc.) once via the same set of APIs for processing across multiple products, independent on a subscription to specific products. In this way, a client can subscribe to a new product and, in real-time, the newly subscribed product can be implemented with the data already sent using the already existing agnostic APIs.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the distinct aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to connect clients to various products through a seamless reliable interface with a single set of product agnostic APIs. In this way, the different compliance solution products can leverage the same data which need only be pushed a single time by the client. This reduces redundant data flow and data inconsistencies across the various products, drastically reducing the error rates, amongst other features. Accordingly, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the distinct aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, which can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. The client devices 210 may include devices of the end consumer and/or the ERP provider, depending on the particular configuration. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
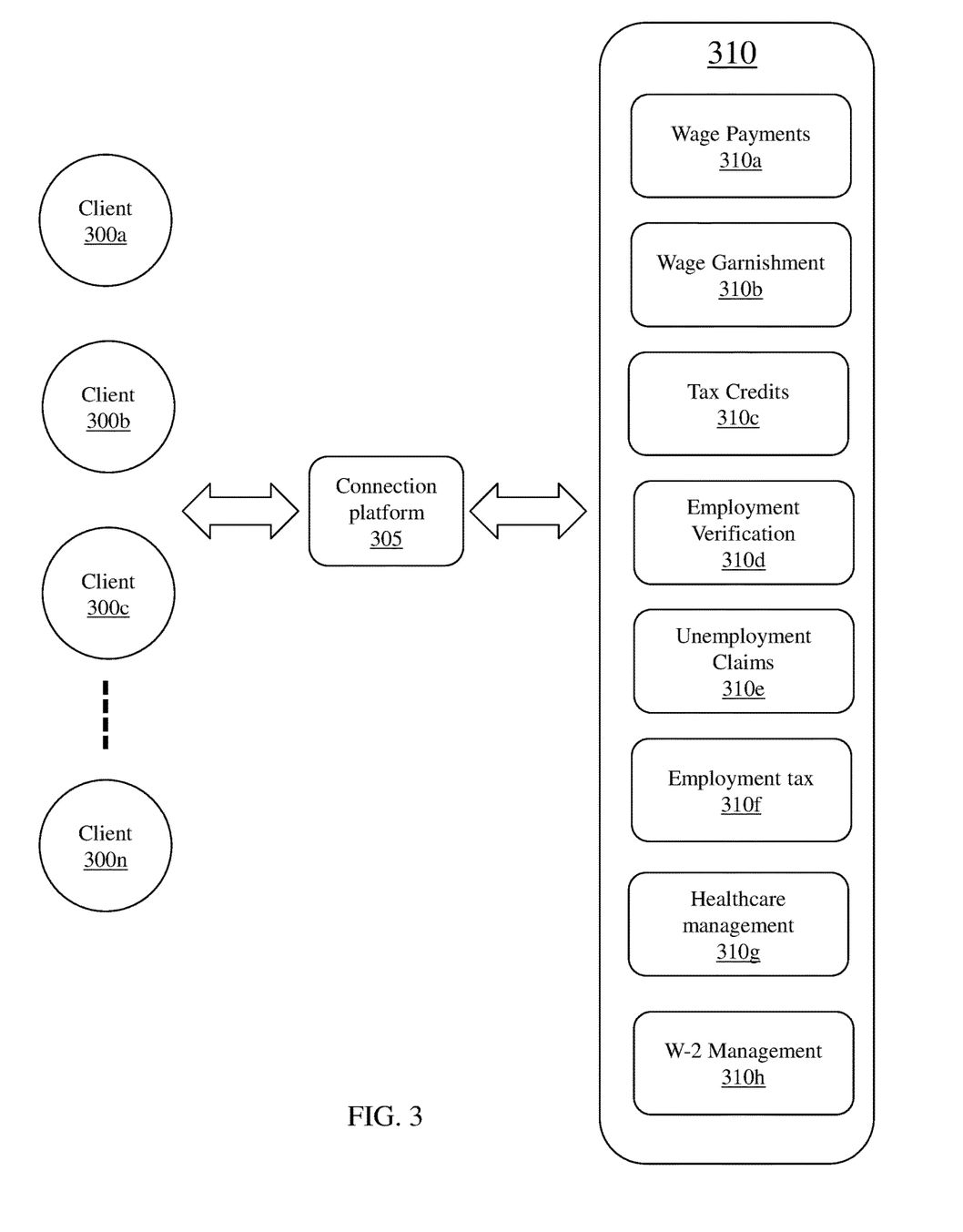
FIG. 3 shows a block diagram in accordance with aspects of the present disclosure.

FIG. 3 shows a block diagram in accordance with aspects of the present disclosure. More specifically, FIG. 3 shows a functional block diagram that illustrates functionality of aspects of the present disclosure. More specifically, the functional block diagram shows clients 300a, 300b, 300c . . . 300n connecting to subscribed products 310 via a connection platform 305 using a single set of product agnostic APIs. The single set of product agnostic APIs allows the clients to send data once through the platform 305 in order to obtain services from any of the products 310. In embodiments, the clients 300a, 300b, 300c . . . 300n can be internal or external customers utilizing, e.g., ERPs; although any customer is contemplated herein. For example, the customer may be a customer such as internal or external HCM providers that require post payroll compliance services such as tax, garnishment, etc. The products may be provided ADP Inc., which includes a compliance solutions unit that supports clients or ERP providers running site payroll products. Also, the single set of product agnostic APIs may be provided through a gateway (e.g., connection platform 305) that allows a client or EPR provider to enter into an ecosystem of the service provider.

The products 310 may be compliance solution products that require APIs, which are a set of definitions and protocols for building and integrating application software. In more specific embodiments, the following products can be provided by leveraging data integrated using the single set of product agnostic APIs:

(i) Wage payments 310a: This product provides flexible and convenient pay options. For example, this product may be a single source for handling payroll options, including, e.g., paycards, direct deposit, paper checks etc., and can deliver secure anytime access to pay, tax and account information for both active and former employees.

(ii) Wage garnishment 310b: This product provides a comprehensive garnishment order processing and disbursement support system to reduce administrative burden, improve compliance and mitigate the risk of penalties. This product also reduces the risk of errors, by ensuring proper calculations, eliminating errors in processing or not responding to a wage garnishment order.

(iii) Tax credits 310c: This product maximizes eligible tax credit opportunities, while minimizing administrative burdens on the client.

(iv) Employment verification 310d: This product provides a platform and process designed to provide employment status and income verification.

(v) Unemployment claims 310e: This product manages unemployment claims. For example, this product provides a platform and process designed to help reduce the risk, cost and burden of managing unemployment claims.

(vi) Employment tax 310f: This product keeps a client compliant with payroll tax laws and requirements. For example, the payroll tax product is a comprehensive tax filing and remittance solution that lets a client spend less time having to understand jurisdictional changes or updating IT systems, and more time focusing on other business objectives.

(vii) Healthcare management 310g: This product reduces the complexities of complying with health care regulations. For example, this product assists in providing timely offers of coverage, fillable forms, and assists in the timely completion of accurate forms.

(viii) W-2 Management 310h: This product reduces errors and saves time during W-2 management process. For example, this product minimizes the effort and resources needed to manage W-2 processing through a cloud-based platform that automates much of the time-consuming work.

In embodiments, a single module may be implemented as multiple modules or multiple modules may be provided as a single module to provide the compliance solution products 310. Moreover, the compliance solution products 310 may be based on a subscription basis such that clients 300a, 300b, 300c . . . 300n, may subscribe to any combination of the different offered products, e.g., compliance solution products 310. It should be recognized by those of skill in the art, that the clients are representative of consumers requiring the product. The consumers may be a client of the ERP partner or any customer of an internal or external HCM provider. Advantageously, though, regardless of the product subscription, the single set of product agnostic APIs will meet the requirements of implementing any of the products 310 without the need to send redundant data for each different product.

The single set of product agnostic APIs may be used and/or built by the clients 300a, 300b, 300c . . . 300n to define which data is to be sent for any combination of the products 310 based on a subscription basis. Illustratively, with the single set of product agnostic APIs, the client may send the appropriate data necessary to implement any combination of products 310, and should the client wish to subscribe to any additional products 310, new APIs will not be necessary to send the required data of the new product. Instead, the single set of product agnostic APIs has already defined and been used to send the data necessary to execute any of the offered products. The system can simply parse the needed data which was already received to leverage against any newly subscribed to product. This is due to the fact that the single set of product agnostic APIs already understands and categorizes the data needs across the post-payroll outsourcing services (e.g., products 310) thus being able to provide the full suite of services across various products. Accordingly, this allows the integration platform, e.g., connecting platform 305, to connect clients with a cloud based payroll/HCM solution in real time through a seamless reliable interface and rich in-product experience within a single ecosystem of, e.g., compliance solution products 310.

In embodiments, the connection platform 305 may be SmartConnect™ from ADP Inc. In further embodiments, the connection platform 305 provides automatic compliance updates, data verification and transmission, error notification and centralized configuration management through the single set of product agnostic APIs. Also, by implementing the single set of product agnostic APIs, the clients 300*a*, 300*b*, 300*c* . . . 300*n* may now be able to provide secure transfer of data, reduce system integrator reliance, and provide consistent and reliable integration of data in real-time.

Figure 4:
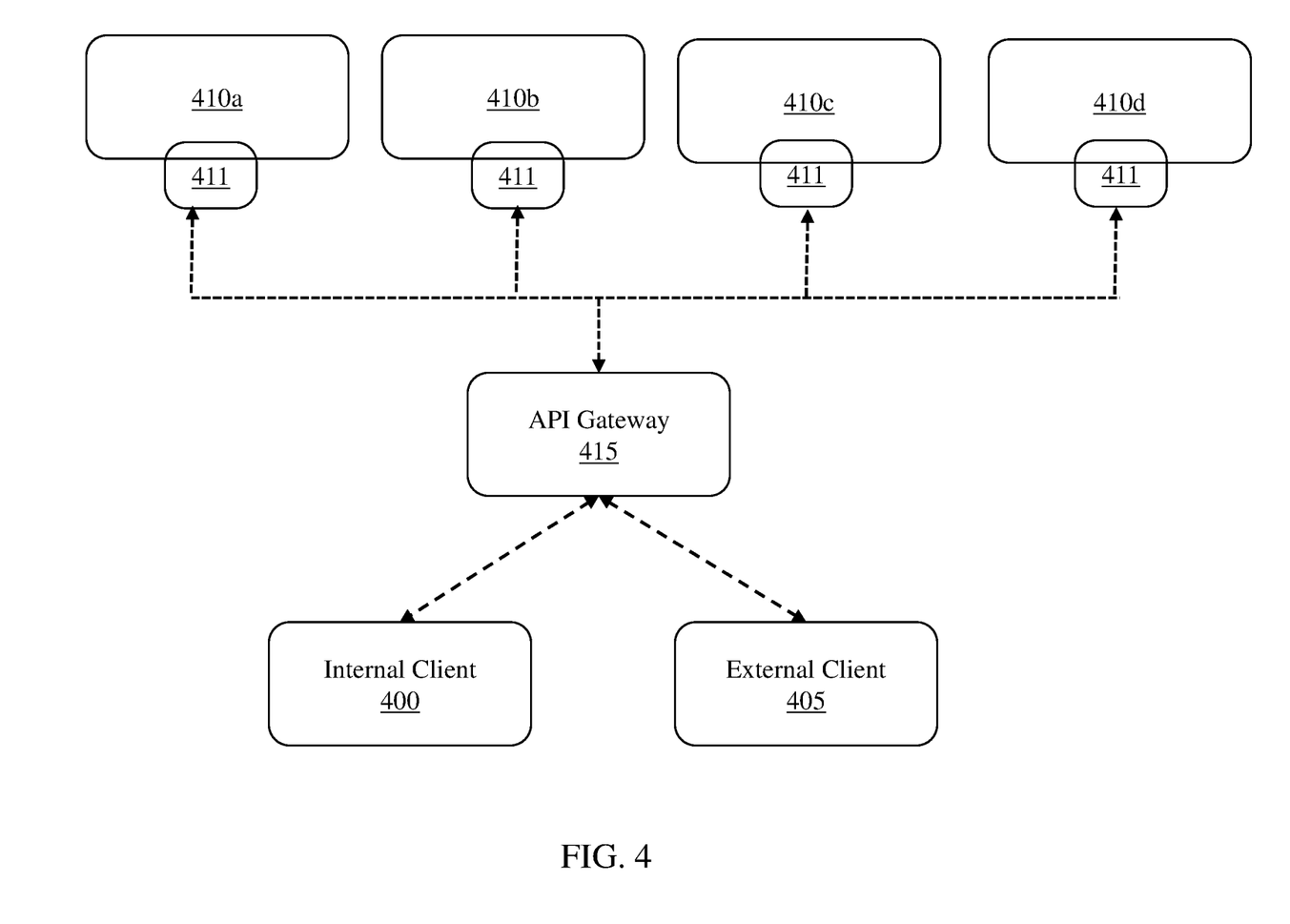
FIG. 4 depicts a system overview in accordance with aspects of the present disclosure.

FIG. 4 depicts a system overview in accordance with aspects of the present disclosure. In embodiments, the system overview includes a plurality of internal clients 400 and external clients 405 (e.g., clients 300*a*, 300*b*, 300*c* . . . 300*n* shown in FIG. 3). In embodiments, the internal clients 400 may be different HCM systems or ERPs, whereas the external clients 405 may be third parties (e.g., ERP providers) that provide payroll services to different businesses. In embodiments, each of the clients 400, 405 may subscribe to different product offerings represented by the different modules 410*a*, 410*b*, 410*c*, 410*d*. These modules 410*a*, 410*b*, 410*c*, 410*d* can be representative of any of the products 310*a*, 310*b*, 310*c*, 310*d*, 310*e*, 310*f*, 310*h* shown in FIG. 3, as an example. Although not critical to the understanding of the present disclosure, each of the modules 410*a*, 410*b*, 410*c*, 410*d* may include an application load balancer 411 (which is capable of allocating resources) and an API to allow processing outside of the internal system, e.g., the cloud as described in FIG. 2.

The different clients 400, 405 may access the products (e.g., services associated with the products) through a single API gateway 415. In embodiments, the single API gateway 415 may be a management tool that sits between the clients 400, 405 and a collection of the backend services, e.g., different modules 410*a*, 410*b*, 410*c*, 410*d*. In embodiments, the API gateway 415 acts as a reverse proxy to accept all API calls from the single set of product agnostic APIs, aggregate the various services required to fulfill them, and return the appropriate result. In embodiments, the API gateway 415 may be the connection platform 305 shown FIG. 3.

In more specific embodiments, as a part of the integration described herein, clients 400, 405 may be provided with access to the API gateway 415. The API gateway may access systems which provide technical documents for building a connector application which can then access the APIs URLs/end points, e.g., modules 410*a*, 410*b*, 410*c*, 410*d*. The building of the connector application is a one-time process which allows clients 400, 405 to subscribe to a central portal for access to the different modules 410*a*, 410*b*, 410*c*, 410*d* via the set of product agnostic APIs. This allows clients 400, 405 to push the data to any of the modules 410*a*, 410*b*, 410*c*, 410*d* thus gaining access and use to the services associated with any combination of the modules 410*a*, 410*b*, 410*c*, 410*d*.

In embodiments, the single set of product agnostic APIs defines the data required for the different modules 410*a*, 410*b*, 410*c*, 410*d*. As already disclosed, the data being sent through the single set of product agnostic; APIs does not support any single, specific product; instead, the single set of product agnostic APIs categorizes the data into usable "chunks" which can be combined or parsed to be used with any of the products associated with the different modules 410*a*, 410*b*, 410*c*, 410*d*. For example, in conventional paradigms, the APIs would be specific to a product offering, providing data to that product only. In this paradigm, different product offerings may require the same data; however, as the APIs are product specific, data that is common to various products may need to be sent multiple times through the multiple product specific API. Also new offerings would require building of new APIS, which is time consuming and expensive. In the present disclosure, though, the single set of product agnostic APIs categorizes the data into distinct groups such that data need be sent only once even though it is used in various products, e.g., by the different modules 410*a*, 410*b*, 410*c*, 410*d*.

By way of illustrative and non-limiting example, the integration may be supported by the following single set of product agnostic APIs, which are used to obtain services across multiple products (e.g., the products 310*a*, 310*b*, 310*c*, 310*d*, 310*e*, 310*f*, 310*h*). As noted, this set of product agnostic APIs will categorize the data into usable groups which can be leveraged by any combination of various products offerings as described with respect to at least Tables 1-3 below.

(i) OrganizationUnit API: defines data required to send organization level details of a client such as name, id, jurisdictions, and location.

(ii) WorkerProfile API: defines data required to send profile level details of a worker such as name, job details, and marital status.

(iii) WorkerPayStatement API: defines data required to send payroll data for a worker, pay statements, earnings, and deductions.

(iv) WorkerTax API: defines data required to send different tax types and amounts for a worker within a payroll.

(v) WorkerLien API: defines data required to send lien information of a worker required for garnishments.

(vi) StartEvent API: defines data required to send meta data of each event based data push such as number of upcoming worker profiles.

(vii) EndEvent API: defines data required to inform the service provider, e.g., ADP, that the data has been fully pushed from the clients.

It should be recognized by those of skill in the art that the nomenclature (e.g., name) for each of the APIs is arbitrarily assigned and should not be considered as a limiting feature of the present disclosure. For example, the APIs may be provided with any name which, for example, designates a functionality of the API or which may be provided by a programmer, developer, etc. Accordingly other names for the APIs are contemplated herein and can even be designated as a generic API, e.g., API1, API2, as described below.

Table 1 shows an example of which exemplary APIs define data required to be sent for the various products 310 offered by the different modules 410*a-d*.

TABLE 1

| Product/API | Wage Payments | Wage Garnishments | Employment Verification | Employment Tax |
|---|---|---|---|---|
| OrganizationUnit API | X | X | X | X |
| WorkerProfile API | X | X | X | X |
| WorkerPayStatement API | X | X | X | |
| WorkerTax API | | | | X |
| WorkerLien API | | X | | |

By way of example using the integration shown in Table 1, implementation of the wage payments product requires data sent through the OrganizationUnit API, WorkerProfile API and WorkerPayStatement API. Also, as an example, implementation of the wage garnishments product requires data sent through the OrganizationUnit API, WorkerProfile API, WorkerPayStatement API and WorkerLien API. As thus seen, the data needed to be sent to the OrganizationUnit API, WorkerProfile API and WorkerPayStatement API is common to both the wage payments product and the wage garnishments product. Accordingly, it is possible to leverage the data already sent to the wage payments product in the wage garnishments product, without sending the same data again (as would be done with a product specific API). Accordingly, the different APIs are not product specific; instead, the single set of product agnostic APIs can be leveraged across various products to provide the same data thus eliminating the need for sending redundant data as would be required with product specific APIs.

In embodiments, the integration may be triggered by events within the client ecosystem, where an event may be required for a particular product. By way of example, Table 2 shows different events which can trigger different product offerings, e.g., wage payments, wage garnishments, employment verification and employment tax. Similar to the APIs, it should be recognized by those of skill in the art that the nomenclature (e.g., name) for each of the events is arbitrarily assigned and should not be considered as a limiting feature of the present disclosure. For example, the event may be provided with any name which, for example, describes the event or which may be provided by a programmer, developer, etc. Accordingly other names for the events are contemplated herein.

history event could trigger the employment verification product; whereas, a tax event, e.g., quarterly or month, could trigger the employment tax product. Similarly, the lien history, worker update and tax adjustment events could trigger, respectively, the wage garnishment product, employment verification product and employment tax product. In this way, a specific event may trigger the need for a specific product. But, by using the single set of product agnostic APIs as shown in Table 1, for example, the products may still be provided with the required data by a single transmission of such data using the product agnostic APIs described herein. Illustratively, a payroll event and a lien event may both require the use of the same product, e.g., Wage Garnishments, which, in turn, requires the same agnostic APIs as shown in Table 1.

Table 3 is a generic table comprising a listing of generic events, respective products that may be triggered by the generic events and generic APIs used to define the data that is to be sent to leverage the products. More specifically, Table 3 is a generic combination of Tables 1 and 2. For example, Table 3 lists a single set of product agnostic APIs, i.e., API1, API2, API3, API4, API5, that integrate with the different generic products, e.g., Product 1, Product 2, Product 3, Product 4, which may be triggered by different events, e.g., Events 1-8 (and which may use data defined to be sent by the product agnostic APIs). It should be understood by those of skill in the art that the various products may be different compliance solutions, e.g., wage payments, wage garnishments, employment verification and employment

TABLE 2

| Event/Product | Payroll | Payroll History | Quarter Tax | Monthly Tax | Lien History | Worker Update | Tax Adjustment |
|---|---|---|---|---|---|---|---|
| Wage Payments | X | | | | | | |
| Wage Garnishments | X | | | | X | | |
| Employment Verification | X | X | | | | X | |
| Employment Tax | X | | | X | X | | X |

By way of explanation using the integration of Table 2, a payroll event could trigger the implementation of the following products: wage payments, wage garnishments, employment verification and employment tax. A payroll tax, etc.; although other products are also contemplated herein. Also, in embodiments, a service provider could offer any combination of these products on a subscription and/or fee agreement basis.

TABLE 3

| Event | Frequency | API 1 | API 2 | API 3 | AP 4 | API 5 | Product 1 | Product 2 | Product 3 | Product 4 |
|---|---|---|---|---|---|---|---|---|---|---|
| Event 1 | | X | X | X | X | X | X | X | X | X |
| Event 2 | N/A | X | X | | | X | X | | | X |
| Event 3 | | X | X | | | X | X | | | X |
| Event 4 | | X | X | | | X | X | | | X |
| Event 5 | On-demand | X | X | X | | | | | X | |
| Event 6 | Real-time | X | X | | | | | | X | |
| Event 7 | On-demand | X | X | X | X | | | X | | |
| Event 8 | | | | | | | | | | |

In the above example, a generic event 1 may trigger the use of products 1-4. The data required to leverage the products may be provided using generic APIs 1-5. By way of even more specific example, event 5 may be a payroll history event shown as an On-Demand Event, and which requires to push or leverage the data defined to be sent by APIs 1-3, e.g., OrganizationUnit API, WorkerProfile API and WorkerPayStatement API. However, the data from APIs 1-3 may also be leveraged by other products that are triggered by other events such that there is no need to send redundant data as is necessary with the use of product specific APIs.

Figure 5:
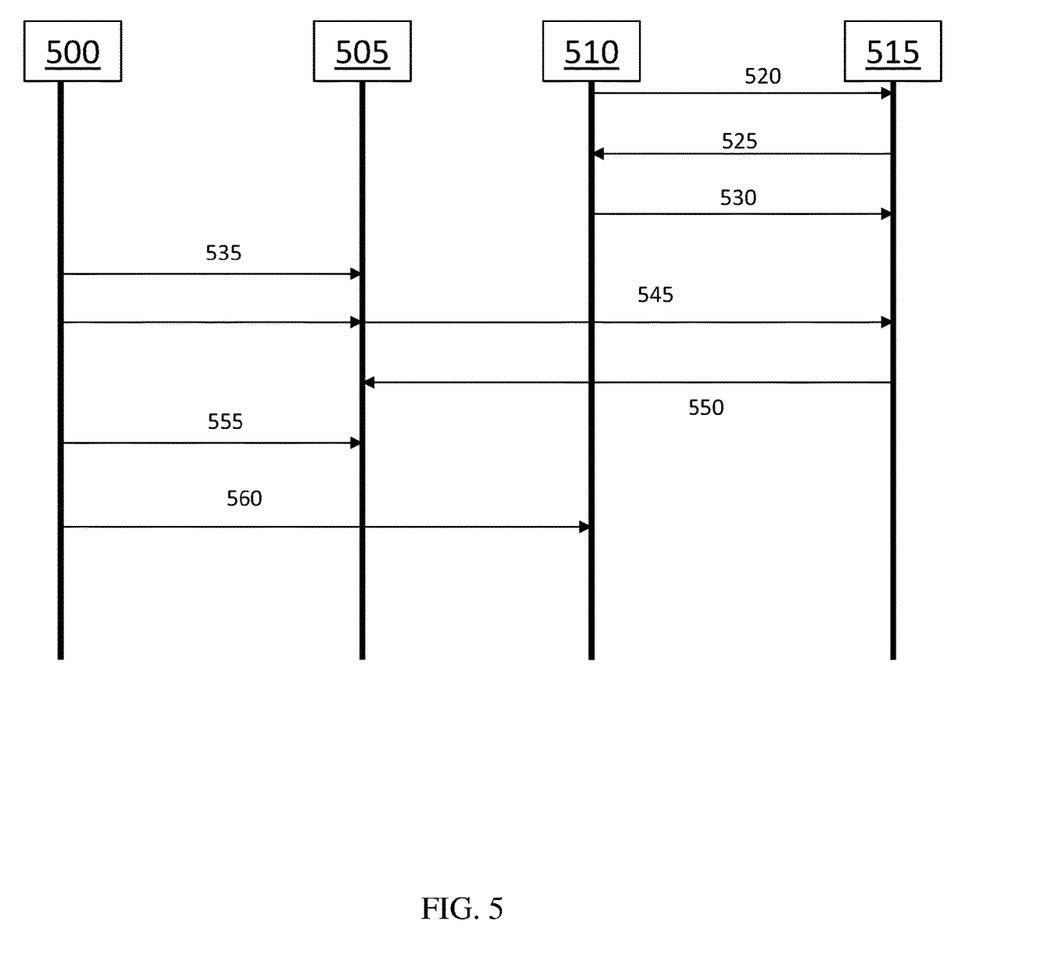
FIG. 5 shows a login process implementing processes in accordance with aspects of the present disclosure.
Figure 6:
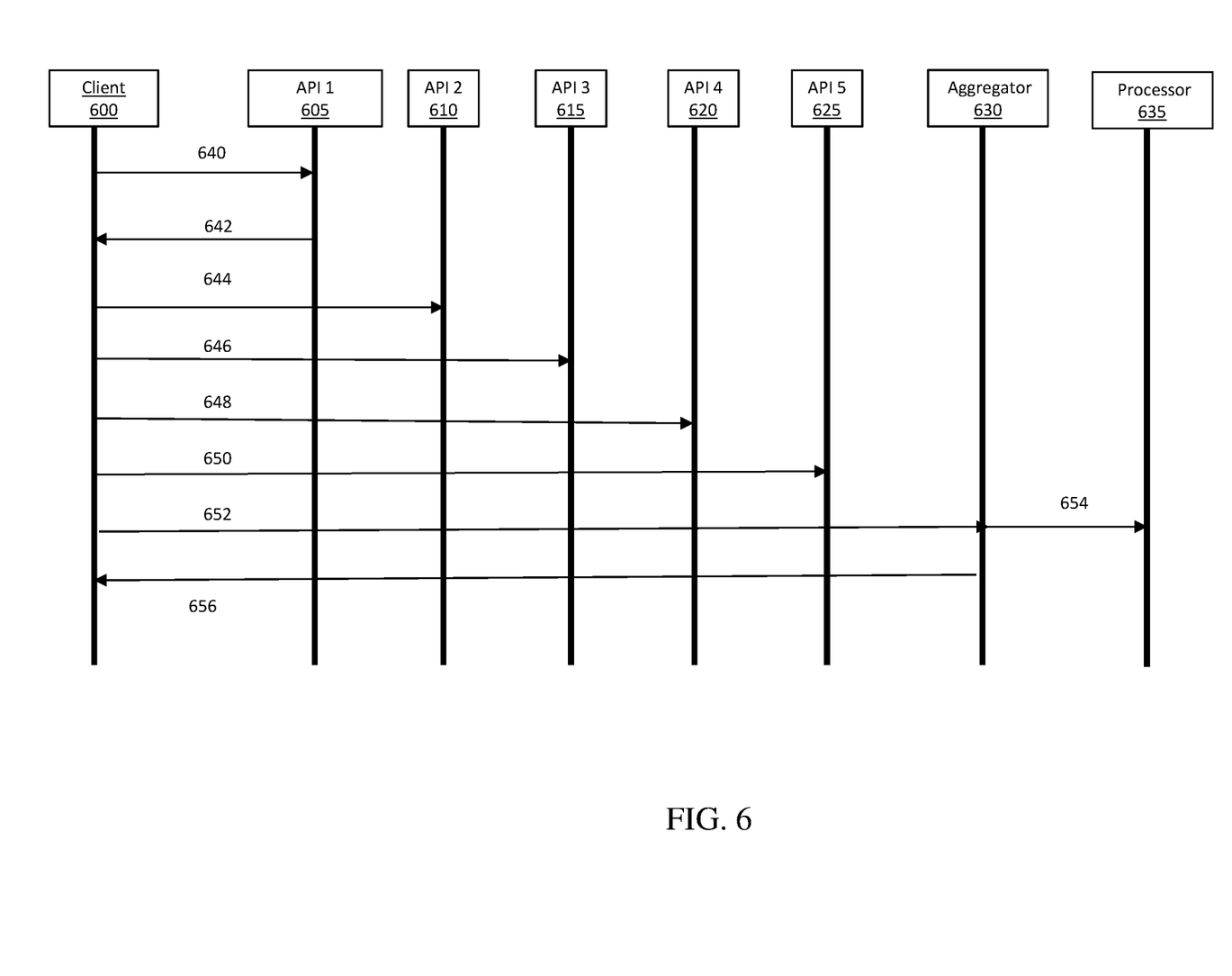
FIG. 6 shows an exemplary flow of an event which triggers implementation of a certain product and which leverages data called using particular agnostic APIs in accordance with aspects of the present disclosure.

FIGS. 5 and 6 are exemplary flows (swim lane diagrams) for processes in accordance with aspects of the present disclosure. The exemplary flows can be illustrative of a system, a method, and/or a computer program product and related functionality implemented on the computing system of FIG. 1, in accordance with aspects of the present disclosure. The computer program product may include computer readable program instructions stored on computer readable storage medium (or media). The computer readable storage medium may include the one or more storage medium as described with regard to FIG. 1, e.g., non-transitory media, a tangible device, etc. The method, and/or computer program product implementing the flows of FIGS. 5-6 can be downloaded to respective computing/processing devices, e.g., computing system of FIG. 1 as already described herein, or implemented on a cloud infrastructure as described with regard to FIG. 2. Accordingly, the processes associated with each flow of the present disclosure can be implemented by special purpose hardware-based systems that perform the specified functions or acts or carry out combinations of special purpose hardware and computer instructions.

FIG. 5 shows a login process implementing processes in accordance with aspects of the present disclosure. The swim lane of FIG. 5 shows the following actors: a user 500, an interface/portal 505, a connector integrator 510 and a service provider 515. In embodiments, the interface/portal 505 may be a portal provided by the service provider for the user to gain access to the products. The service provider 515 may be representative of a secure gateway or digital storefront that enables the user (or client) to connect and share data across different solutions (products). The connector integrator 510 may be e.g., the ERP provider. In embodiments, the connector integrator 510 obtains documentation from the service provider 515 to build the single set of product agnostic APIs, applications, as well as assisting the user in their human resource needs (e.g., provide payroll services).

At step 520, the connector integrator 510 sends a notification to the service provider 515 that an application is created, i.e., single set of product agnostic APIs. In embodiments, the application will include the set of product agnostic APIs, which allow the client (i.e., which can be the ERP provider or the end consumer of the product working directly with the provider of payroll services also offering the compliance solution products, e.g., ADP Inc.) to "plug" into the various products. In embodiments, the application can be created (e.g., built) using the appropriate instructions or basic parameters (e.g., technical documents) received from the service provider 515. At step 525, the service provider 515 sends a certificate, client ID, user password and/or other security information to validate and/or authenticate the application. Accordingly, steps 520 and 525 may be security layers to protect the service provider 515. In this way, data can flow between the connector integrator 510 and service provider 515 for integration of the product agnostic APIs. At step 530, the connector integrator 510 sends a list of the applications to the service provider 515, which can be displayed to the end user.

At step 535, the user 500 logs onto the interface/portal 505. At step 545, the user 500 subscribes to a particular product using the application of the client 510 by sending a subscription request through the interface/portal 505 to the service provider 515. At step 550, the service provider 515 sends an object identifier (security) to the interface/portal 505, for the user 500. At step 555, the user copies credentials to the interface/portal 505 and, at step 560, updates the credentials for the connector integrator 510. These credentials may be provided to the service provider 515 so that the client or user can gain access to the particular products offered by the service provider 515 and subscribed to by the end user.

FIG. 6 shows an exemplary flow of an event which triggers implementation of a certain product and which leverages certain data called by particular product agnostic APIs. For example, FIG. 6 may be representative of a payroll event which requires access, use and implementation of wage payment and tax products. In FIG. 6, the actors/objects include: a client 600, API1 605, API2 610, API3 615, API4 620, API5 625, event aggregator 630 and processor 635. In the example of FIG. 6, the APIs 605-625 may, for example, (i) the StartEvent API, (ii) the OrganizationUnit API, (iii) the WorkerProfile API, (iv) the WorkerPayStatement API, and (v) the WorkerTax API (which may be designated with a generic name or other name that describes the functionality associated with the API, for example). The event aggregator 630 may aggregate all of the data leveraged by the APIs 605-625 for processing in data processor 635. In embodiments, the processor 635 may be any of the modules of FIG. 4 or products listed in FIG. 3, which leverages the data defined and called upon by the APIs 605-625.

By way of example, at step 640, the client starts an event, e.g., payroll event. The event will be provided to the StartEvent API 605. The StartEvent API 605 will send a transactional ID to the client at step 642. At steps 644 to 652, the different product agnostic APIs are call up such that the data required for each of the different agnostic APIs can be sent to an aggregator 630 at step 652. At step 652, the data sent to the aggregator 630 is aggregated for use by any of the subscribed to products. At step 654, the data from the different APIs are leveraged by the processor 635 for implementation in one or more products subscribed to by the client. At step 656, the aggregator 630 sends a notification to the client 600, indicating that the product has completed its tasks using the leveraged data. In embodiments, the client 600 may view the results on a user interface, e.g., web browser-based or interface/portal 505 as already described herein.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method comprising:
    receiving, by a computer system, from a client system, technical documents comprising information about a single set of product agnostic application programming interfaces (APIs), wherein the single set of product agnostic APIs are used, by the computer system, to access a plurality of products, wherein a first product of the plurality of products is accessed using multiple product agnostic APIs of the single set of product agnostic APIs;
    building, by the computer system, using the technical documents, an application that is configured to: i) receive a request from the client system to execute one of the plurality of products, and ii) responsive to the request, use the single set of product agnostic APIs to access the one of the plurality of products;
    receiving, by the application executed by the computer system, the request to execute at least one product of the plurality of products;
    accessing, by the application executed by the computer system, in accordance with the request, a first dataset from the client system that is specified by the single set of product agnostic APIs;
    parsing, by the application executed by the computer system, the first dataset to identify a second dataset that is useable across the plurality of products;
    sending, by the application executed by the computer system, the second dataset to the at least one product to cause the at least one product to perform an operation using the second dataset; and
    providing, by the computer system, a notification to the client system related to the performance of the operation by the at least one product using the second dataset.

2. The method of claim 1, wherein the single set of product agnostic APIs specifies one or more data categories, each data category of the one or more data categories specifying data.

3. The method of claim 2, wherein the data of the one or more data categories are useable over one or more products of the plurality of products.

4. The method of claim 3, wherein the at least one product of the plurality of products uses data defined by the one or more product agnostic APIs of the single set of product agnostic APIs.

5. The method of claim 2, wherein the plurality of products comprises subscribed products and unsubscribed products.

6. The method of claim 1, further comprising receiving, by the application executed by the computer system, a request to subscribe to a second product of the plurality of products, wherein the second product is an unsubscribed product.

7. The method of claim 6, further comprising sending, by the application executed by the computer system, the second dataset to the second product of the plurality of products to cause the second product to perform the operation using the second dataset.

8. The method of claim 1, wherein each product agnostic API of the single set of product agnostic APIs specifies data useable across at least one of the plurality of products.

9. The method of claim 1, wherein parsing the first dataset to identify the second dataset that is useable across the plurality of products comprises determining, by the application executed by the computer system, that predetermined categories of the single set of product agnostic APIs specify the second dataset.

10. The method of claim 1, wherein receiving the request to execute the least one product of the plurality of products is responsive to receiving, by the application executed by the computer system, from the client system, an indication of an event trigger.

11. The method of claim 10, wherein the event trigger is associated with one or more products of the at least one product.

12. The method of claim 1, wherein the single set of product agnostic APIs specify data to send for both subscribed and unsubscribed products, such that when a user subscribes to a second product that is an unsubscribed product, the application executed by the computer system can send a portion of the first dataset to the second product to cause the second product to perform the operation using the portion of the first dataset.

13. A system comprising:
    a memory; and
    one or more processors configured to execute instructions stored in the memory to:
    receive, from a client system, technical documents comprising information about a single set of product agnostic application programming interfaces (APIs), wherein the single set of product agnostic APIs are used, by the one or more processors, to access a plurality of products, wherein a first product of the plurality of products is accessed using multiple product agnostic APIs of the single set of product agnostic APIs;
    build, using the technical documents, an application that is configured to: i) receive a request from the client system to execute one of the plurality of products, and ii) responsive to the request, use the single set of product agnostic APIs to access the one of the plurality of products;
    receive, via the application executed by the one or more processors, the request to execute at least one product of the plurality of products;
    access, via the application executed by the one or more processors, in accordance with the request, a first dataset from the client system that is specified by the single set of product agnostic APIs;
    parse, via the application executed by the one or more processors, the first dataset to identify a second dataset that is useable across the plurality of products;
    send, via the application executed by the one or more processors, the second dataset to the at least one product to cause the at least one product to perform an operation using the second dataset; and provide, via the one or more processors, a notification to the client system related to the performance of the operation by the at least one product using the second dataset.

14. The system of claim 13, wherein the single set of product agnostic APIs specifies one or more data categories, each data category of the one or more data categories specifying data.

15. The system of claim 14, wherein the data of the one or more data categories are useable over one or more products of the plurality of products.

16. The system of claim 15, wherein the at least one product of the plurality of products uses data defined by the one or more product agnostic APIs of the single set of product agnostic APIs.

17. The system of claim 14, wherein the plurality of products comprises subscribed products and unsubscribed products.

18. The system of claim 13, wherein the one or more processors further:

receive, via the application, a request to subscribe to a second product of the plurality of products, wherein the second product is an unsubscribed product.

19. The system of claim 18, wherein the one or more processors further:

send, via the application, the second dataset to the second product of the plurality of products to cause the second product to perform the operation using the second dataset.

20. The system of claim 13, wherein each product agnostic API of the single set of product agnostic APIs specifies data useable across at least one of the plurality of products.

21. The system of claim 13, wherein to parse the first dataset to identify the second dataset that is useable across the plurality of products, the one or more processors further:

determine, via the application, that predetermined categories of the single set of product agnostic APIs specify the second dataset.

* * * * *